United States Patent
Choi et al.

(10) Patent No.: US 9,080,537 B2
(45) Date of Patent: Jul. 14, 2015

(54) IN-TANK FILTER OF FUEL PUMP MODULE

(75) Inventors: Youngchol Choi, Cheonan-si (KR); Hayoung Cho, Daejeon (KR); Jinsik Hwang, Chungcheongnam-do (KR); Chanheum Yoon, Chungcheongnam-do (KR); Jongman Lee, Chungju-si (KR); Younghoon Kim, Chungcheongnam-do (KR); Haisung Lee, Daejeon (KR)

(73) Assignee: COAVIS, Chungcheongnam-do (KR)

( * ) Notice: Subject to any disclaimer, the term of this patent is extended or adjusted under 35 U.S.C. 154(b) by 679 days.

(21) Appl. No.: 13/070,079

(22) Filed: Mar. 23, 2011

(65) Prior Publication Data

US 2011/0233122 A1    Sep. 29, 2011

(30) Foreign Application Priority Data

Mar. 24, 2010   (KR) .......... 10-2010-0026233

(51) Int. Cl.
*B01D 35/02* (2006.01)
*B01D 35/31* (2006.01)
*F02M 37/10* (2006.01)
*B01D 35/30* (2006.01)
*F02M 37/22* (2006.01)

(52) U.S. Cl.
CPC ............. *F02M 37/106* (2013.01); *B01D 35/30* (2013.01); *B01D 35/31* (2013.01); *B01D 35/02* (2013.01); *F02M 2037/225* (2013.01)

(58) Field of Classification Search
None
See application file for complete search history.

(56) References Cited

U.S. PATENT DOCUMENTS

| | | | | |
|---|---|---|---|---|
| 3,450,264 A * | 6/1969 | Graybill | ........................ | 210/137 |
| 5,227,055 A * | 7/1993 | Timmons | ...................... | 210/151 |
| 5,740,772 A * | 4/1998 | Bluma | ..................... | 123/196 AB |
| 6,640,832 B2 * | 11/2003 | Walter | ....................... | 137/565.01 |
| 7,901,572 B2 * | 3/2011 | Sato | ............................ | 210/172.4 |
| 8,137,546 B2 * | 3/2012 | Ogose | ......................... | 210/172.4 |
| 8,197,685 B2 * | 6/2012 | Ribet et al. | ..................... | 210/230 |
| 8,372,278 B1 * | 2/2013 | Nguyen et al. | .............. | 210/172.2 |
| 8,556,087 B2 * | 10/2013 | Andersson et al. | ............ | 210/402 |
| 8,641,896 B2 * | 2/2014 | Remacha et al. | ............. | 210/184 |
| 8,715,497 B2 * | 5/2014 | Schnipke et al. | ........... | 210/172.2 |
| 2008/0264113 A1 * | 10/2008 | Andersson et al. | ............... | 68/93 |
| 2011/0233122 A1 * | 9/2011 | Choi et al. | .................... | 210/171 |
| 2013/0061960 A1 * | 3/2013 | Jeon et al. | ...................... | 137/544 |
| 2013/0098339 A1 * | 4/2013 | Yoon et al. | ..................... | 123/495 |
| 2013/0161249 A1 * | 6/2013 | Kwon | ............................ | 210/232 |
| 2013/0264265 A1 * | 10/2013 | Lin | ................................ | 210/234 |

FOREIGN PATENT DOCUMENTS

| | | |
|---|---|---|
| JP | 9-32679 A | 2/1997 |
| JP | 11-173231 A | 6/1999 |

* cited by examiner

*Primary Examiner* — Robert Popovics
(74) *Attorney, Agent, or Firm* — The Webb Law Firm (57) ABSTRACT

Provided is an in-tank filter, which is a component of a fuel pump module positioned in a fuel tank of a vehicle, etc., to supply fuel to an engine. The in-tank filter includes: a filter media filtering foreign materials; an upper container made of a synthetic resin material and having a filter media insertion space therein, the filter media insertion space having a filter media inserted thereinto; a lower container made of a synthetic resin material and coupled to the upper container to block a lower portion of the upper container; and a deformation prevention reinforcing ring having a container insertion hole formed therein so as to be closely adhered to an outer side of the upper container when the upper container is inserted thereinto and preventing the upper container inserted into the container insertion hole from expanding.

4 Claims, 7 Drawing Sheets

IN-TANK FILTER OF FUEL PUMP MODULE

CROSS-REFERENCE TO RELATED APPLICATIONS

This application claims priority under 35 U.S.C. §119 to Korean Patent Application No. 10-2010-0026233, filed on Mar. 24, 2010, in the Korean Intellectual Property Office, the disclosure of which is incorporated herein by reference in its entirety.

TECHNICAL FIELD

The present invention relates to an in-tank filter, which is a component of a fuel pump module positioned in a fuel tank of a vehicle, etc., to supply fuel to an engine.

BACKGROUND

A vehicle, etc., driven by receiving liquid fuel, such as a gasoline engine, a diesel engine, or the like, includes a fuel tank in which fuel is stored.

In addition, the vehicle includes a fuel pump module forcibly supplying the fuel filled in the fuel tank to the engine.

Figure 1:
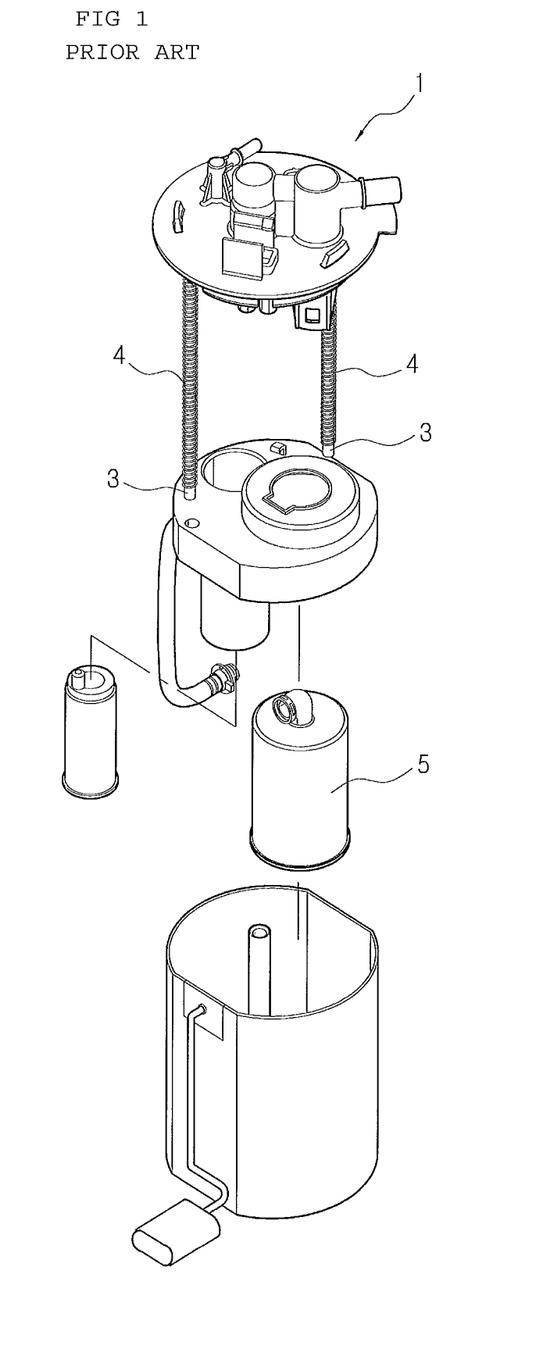
FIG. 1 is an exploded perspective view showing a fuel pump module according to the related art.
Figure 2:
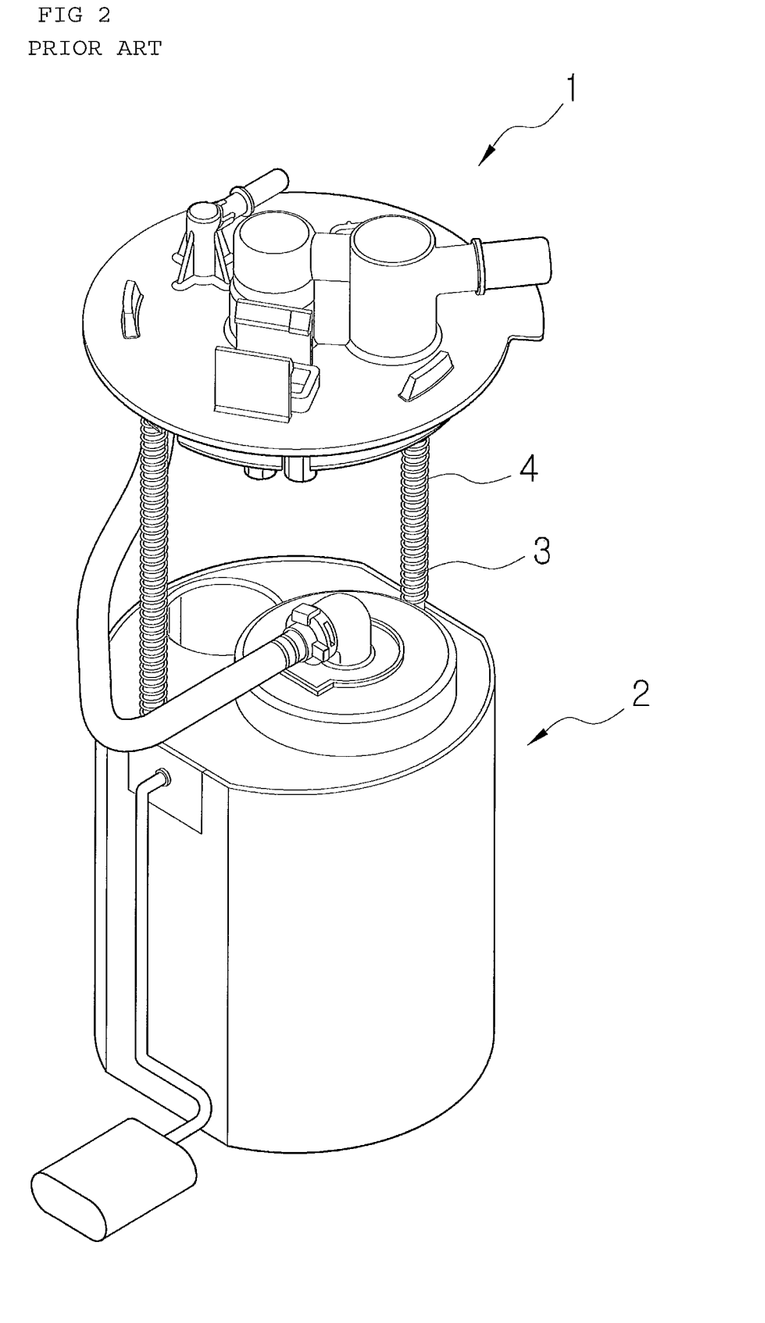
FIG. 2 is a perspective view of a fuel pump module according to the related art.

Generally, the fuel pump module is configured to include a flange assembly 1, a reservoir body assembly 2, a guide rod 3 connecting the flange assembly 1 to the reservoir body assembly 2, a spring 4 positioned on an outer side of the guide rod 3, and an in-tank filter 5 removing foreign materials included in the fuel, as shown in FIGS. 1 and 2.

In most cases, the flange assembly is fixed to an inlet portion of a fuel tank, and the reservoir body assembly is positioned on the bottom of the fuel tank.

In addition, the guide rod, which connects the flange assembly to the reservoir body assembly while guiding the movement of the spring, is configured to slidably move to an inner side of the reservoir body assembly.

Further, the spring is positioned on the outer side of the guide rod, and is positioned between the flange assembly and the reservoir body assembly to thereby allow the reservoir body assembly to be always positioned on the bottom of the fuel tank.

Figure 3:
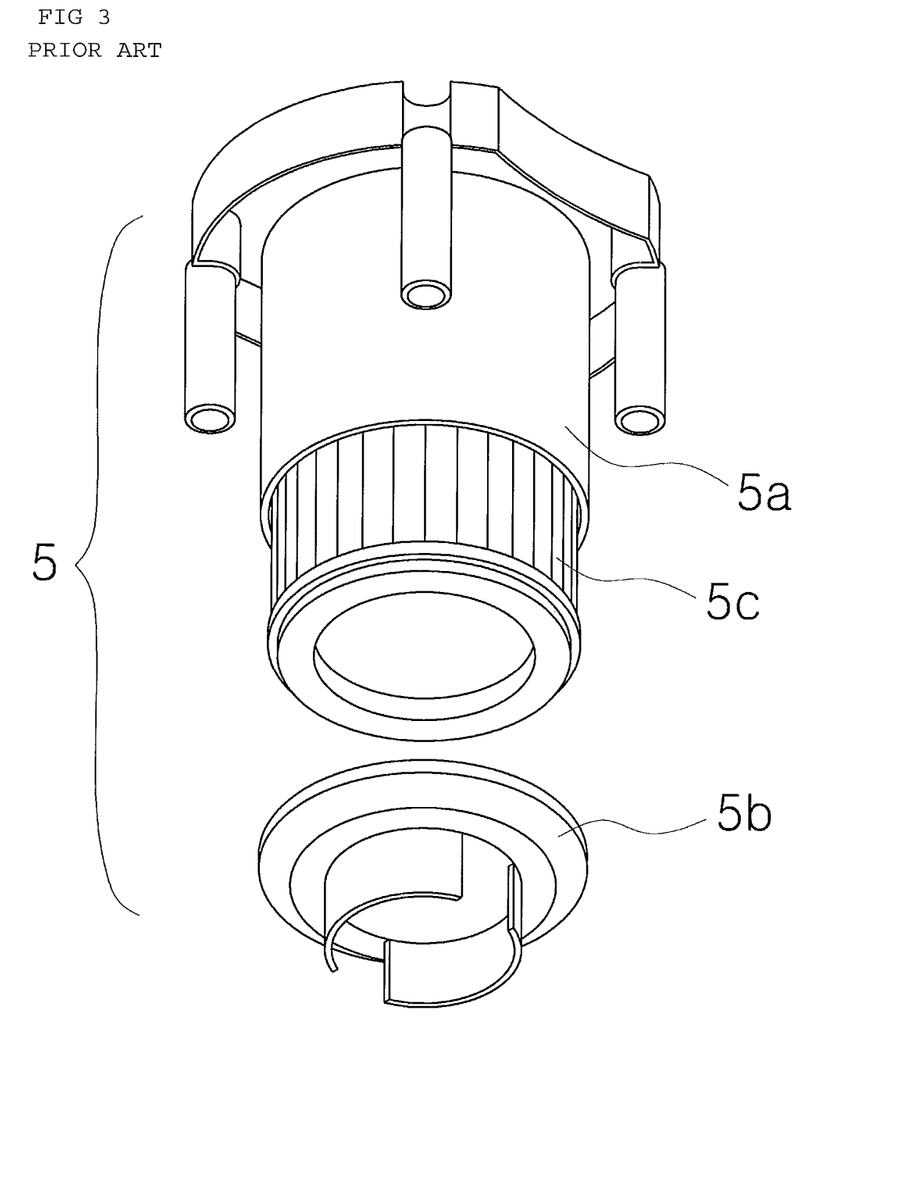
FIG. 3 is a perspective view showing an in-tank filter according to the related art.

The in-tank filter is configured to include an upper container 5a and a lower container 5b coupled to each other and a filter media 5c positioned in an inner side of the coupled upper and lower containers.

(An in-tank filter shown in FIG. 1 has a different shape from that of an in-tank filter shown in FIG. 3; however, it performs the same operation as that of in-tank filter shown in FIG. 3. FIG. 3 is a perspective view describing a general in-tank filter.)

The upper and lower containers are coupled to each other to thereby serve as a pressure container. The upper and lower containers were made of a metal or a synthetic resin.

In the case in which the upper and lower containers were made of a metal, there were problems in that corrosion is caused on surfaces of the upper and lower containers, it is difficult to weld the upper container to the lower container, and production cost is high.

Owing to these reasons, the upper and lower containers made of a synthetic resin material, which is inexpensive and has excellent corrosion resistance, have been mainly used.

However, in the case in which the upper and lower containers made of a synthetic resin material are used, they were vulnerable to high temperature and high pressure in view of the characteristics of the synthetic resin material, such that it is more likely that deformation or a crack is generated during the use of the upper and lower containers.

That is, a coupled body of the upper and lower containers expanded due to an expansion phenomenon and pressure to thereby generate the crack in the container, which causes loss of functions of a fuel pump module, such as water leakage and pressure leakage (the coupled body of the upper and lower containers, which serves as a pressure container, has significant expansion pressure applied thereto. The expansion pressure was generally transferred to the container using high temperature gasoline fuel as a medium; however, the expansion phenomenon was further intensified under a condition in which biofuel such as methanol, ethanol, or the like, is used, thereby generating larger deformation of the container due to the expansion pressure).

Even through the upper and lower containers are implemented to have a thick thickness in order to solve this problem, the upper and lower containers manufactured by molding had a weld line, such that a deformation prevention effect and a crack prevention effect were not satisfactorily improved, and the coupled body of the upper and lower containers was deformed, such that a coupled state in a coupled part (a fusing scheme is generally used) of the upper and lower containers has become bad.

SUMMARY

An embodiment of the present invention is directed to providing an in-tank filter structure of a fuel pump module capable of preventing deformation such as expansion, cracking, or the like, by having excellent durability, in spite of being implemented using upper and lower containers made of a synthetic resin material.

An in-tank module according to the present invention includes a deformation prevention reinforcing ring having a container insertion hole formed therein so as to be closely adhered to an outer side of an upper container when the upper container is inserted thereinto and preventing the upper container inserted into the container insertion hole from expanding, thereby making it possible to prevent a function of a product from being lost due to the crack generation of a surface of an in-tank filter caused by an expansion phenomenon and high pressure expansion during the driving of a vehicle even through upper and lower containers made of a synthetic resin material are used.

The in-tank filter according to the present invention includes a filter media filtering foreign materials.

In addition, the in-tank filter according to the present invention includes an upper container made of a synthetic resin material and having a filter media insertion space therein, the filter media insertion space having a filter media inserted thereinto.

Further, the in-tank filter according to the present invention includes a lower container made of a synthetic resin material and coupled to the upper container to block a lower portion of the upper container.

Furthermore, the in-tank filter according to the present invention includes a deformation prevention reinforcing ring having a container insertion hole formed therein so as to be closely adhered to an outer side of an upper container when the upper container is inserted thereinto and preventing the upper container inserted into the container insertion hole from expanding.

BRIEF DESCRIPTION OF THE DRAWINGS

FIGS. 6A and 6B are schematic views showing processes in which a separation prevention jaw passes through a deformation prevention reinforcing ring, i.e.

[Detailed Description of Main Elements]

| | |
|---|---|
| 1: flange assembly | 2: reservoir body assembly |
| 3: guide rod | 4: spring |
| 5: in-tank filter | 5a: upper container |
| 5b: lower container | 5c: filter media |
| 10: filter media | 20: upper container |
| 21: filter media insertion space | |
| 22: separation prevention jaw | |
| 30: lower container | |
| 40: deformation prevention reinforcing ring | |
| 41: container insertion hole | 42: protrusion. |

DETAILED DESCRIPTION OF EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, exemplary embodiments will be described in detail with reference to the accompanying drawings.

However, the accompanying drawings are only examples shown in order to describe the technical idea of the present invention in more detail. Therefore, the technical idea of the present invention is not limited to the shapes of the accompanying drawings.

The present invention relates to an in-tank filter of a fuel pump module.

Therefore, an in-tank filter according to the present invention includes a filter media 10 filtering foreign materials, similar to the in-tank filter according to the related art.

In addition, the in-tank filter includes an upper container 20 having a filter media insertion space 21 therein, the filter media insertion space 21 having the filter media 10 inserted thereinto.

Further, the in-tank filter includes a lower container 30 coupled to the upper container 20 to block a lower portion of the upper container 20.

An object of the present invention is to provide an in-tank filter capable of preventing deformation such as expansion, cracking, or the like, due to an expansion phenomenon and pressure by having excellent durability even though the upper container 20 and the lower container 30 are made of a synthetic resin material.

Therefore, the upper container 20 and the lower container 30 according to the present invention are made of the synthetic resin material.

The in-tank filter according to the present invention includes a deformation prevention reinforcing ring 40 having a container insertion hole 41 closely adhered to an outer side of the upper container 20 when the upper container 20 is inserted thereinto, thereby making it possible to prevent deformation such as expansion, cracking, or the like, due to an expansion phenomenon and pressure even though the upper container 20 and the lower container 30 made of the synthetic resin material are used. In one embodiment the deformation prevention reinforcing ring 40 is formed by a closed curve.

That is, the deformation prevention reinforcing ring 40 prevents the upper container 20 inserted into the container insertion hole 41 from expanding.

When the upper container 20 does not expand, the crack as well as the expansion phenomenon is not generated.

The deformation prevention reinforcing ring 40 as described above is preferably made of a strong metal material. This is the reason that the deformation prevention reinforcing ring made of a strong metal material is relatively thin and may provide sufficient strength capable of preventing deformation of the upper container 20.

The deformation prevention reinforcing ring may also be made of a strong synthetic resin material. In this case, the deformation prevention reinforcing ring reduces the deformation due to an expansion phenomenon and pressure; however, it has a thickness thicker than that of the deformation prevention reinforcing ring made of a metal.

Figure 4:
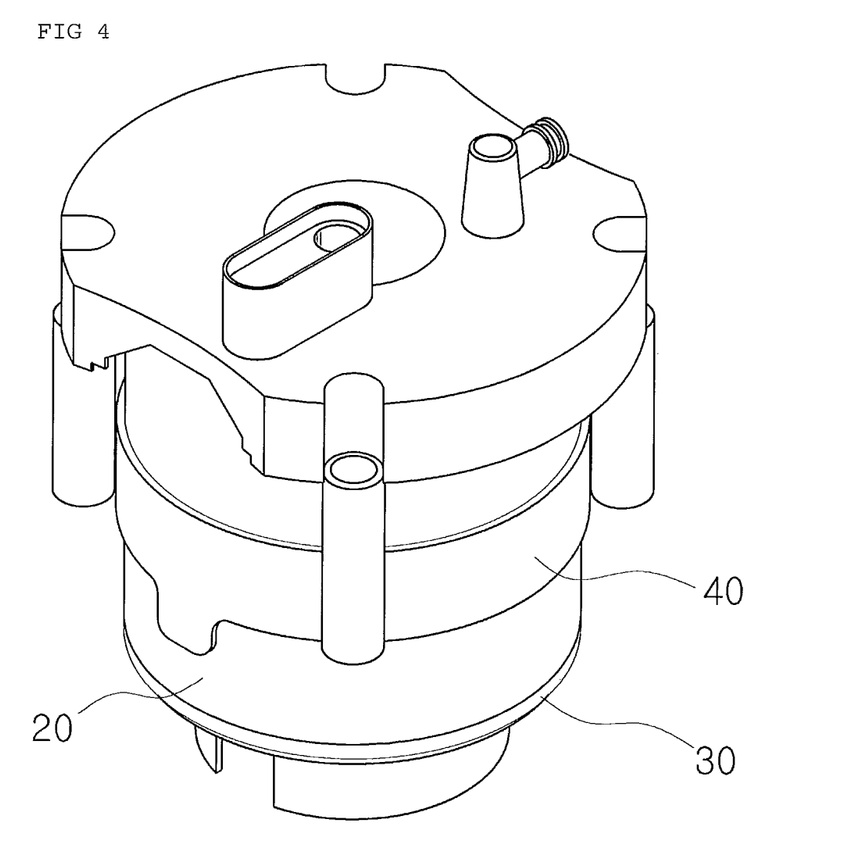
FIG. 4 is a perspective view showing an in-tank filter of a fuel pump module according to the present invention.
Figure 5:
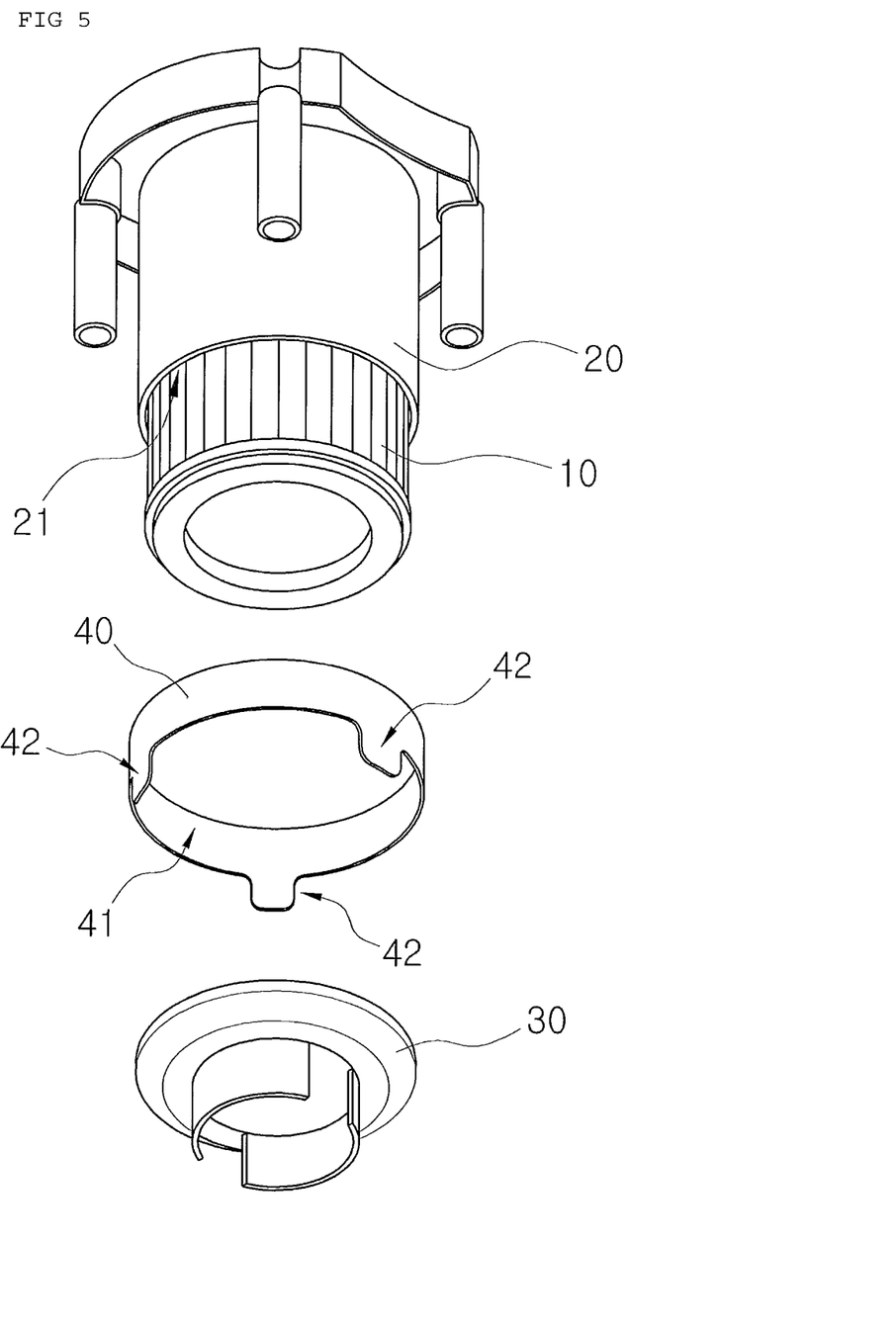
FIG. 5 is an exploded perspective view showing an in-tank filter according to the present invention.

FIG. 4 is a perspective view showing a state in which the upper container 20 is inserted into the deformation prevention reinforcing ring 40 according to the present invention; and FIG. 5 is an exploded perspective view showing an in-tank filter according to the present invention.

According to the present invention, a separation prevention jaw 22 is preferably formed on the upper container 20 in order to prevent the deformation prevention reinforcing ring 40 from being separated from the upper container 20.

That is, the separation prevention jaw 22 is formed in order to prevent the upper container 20 and the deformation prevention reinforcing ring 40 from being decoupled from each other during the use of the in-tank filter in a state in which the upper container 20 is inserted into the container insertion hole 41 of the deformation prevention reinforcing ring 40, such that the upper container 20 and the deformation prevention reinforcing ring 40 are coupled to each other.

The separation prevention jaw 22 may have various shapes; however, it is preferably formed to be protruded so as to have a height capable of passing through the deformation prevention reinforcing ring 40 when the upper container 20 is forcibly inserted into the deformation prevention reinforcing ring 40.

Figure 6:
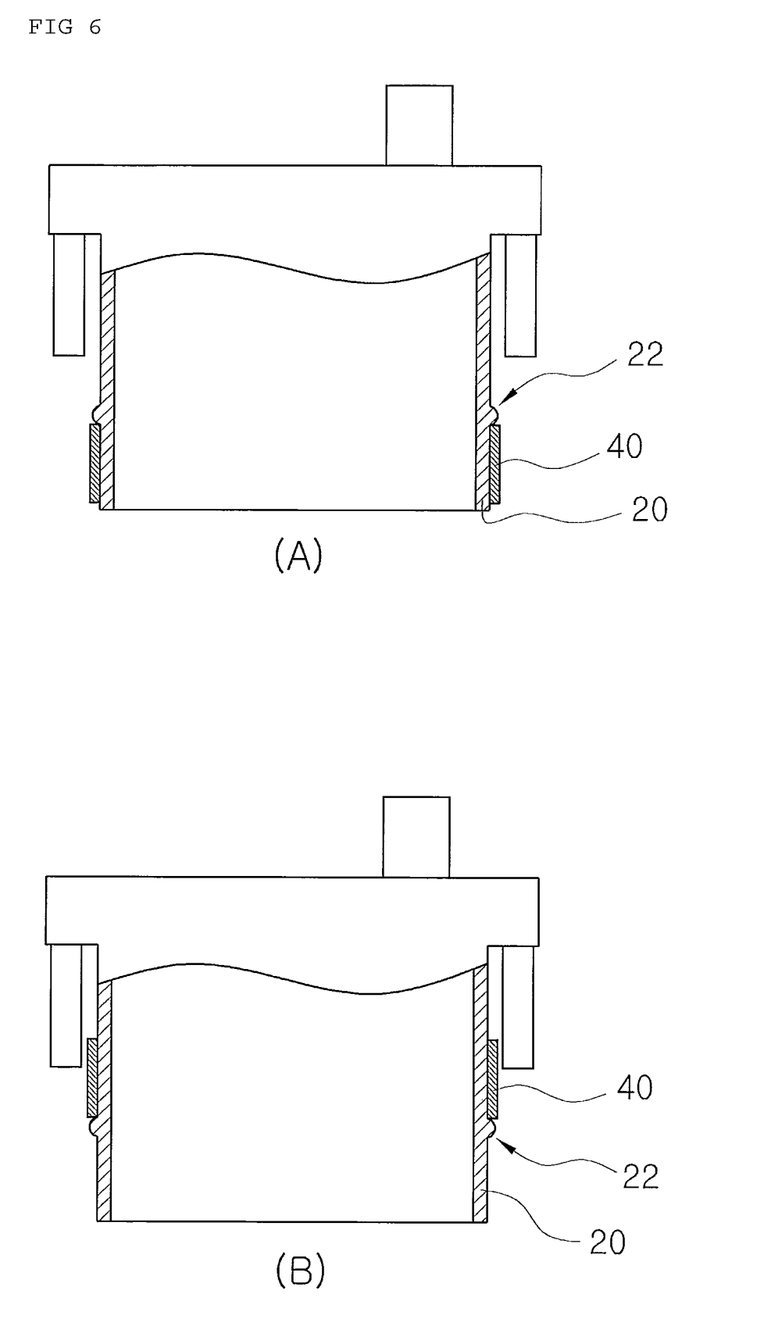
FIG. 6A shows a state in which a separation prevention jaw is caught by a deformation prevention reinforcing ring as an initial state in which an upper container is inserted into the deformation prevention reinforcing ring and FIG. 6B shows a state after the separation prevention jaw passes through the deformation prevention reinforcing ring.

That is, in an initial state in which the upper container 20 is inserted into the deformation prevention reinforcing ring 40, the deformation prevention reinforcing ring 40 is caught by the separation prevention jaw 22, as shown in FIG. 6A. However, when the upper container 20 is forcibly pushed in an insertion direction, the separation prevention jaw 22 passes through the deformation prevention reinforcing ring 40 while entering the container insertion hole 41 of the deformation prevention reinforcing ring 40. After the separation prevention jaw 22 passes through the deformation prevention reinforcing ring 40, it catches the deformation prevention reinforcing ring 40 so that the deformation prevention reinforcing ring 40 is not separated, as shown in FIG. 6B.

The separation prevention jaw 22 has been already applied to various industrial fields. Therefore, a detailed description thereof will be omitted.

According to the present invention, since the upper container 20 is made of the synthetic resin, when the separation prevention jaw 22 formed on an outer portion of the upper container 20 is pressed, a portion at which the separation prevention jaw 22 is formed is drawn inwardly of the upper container 20, such that the separation prevention jaw 22 may pass through the deformation prevention reinforcing ring 40.

Figure 7:
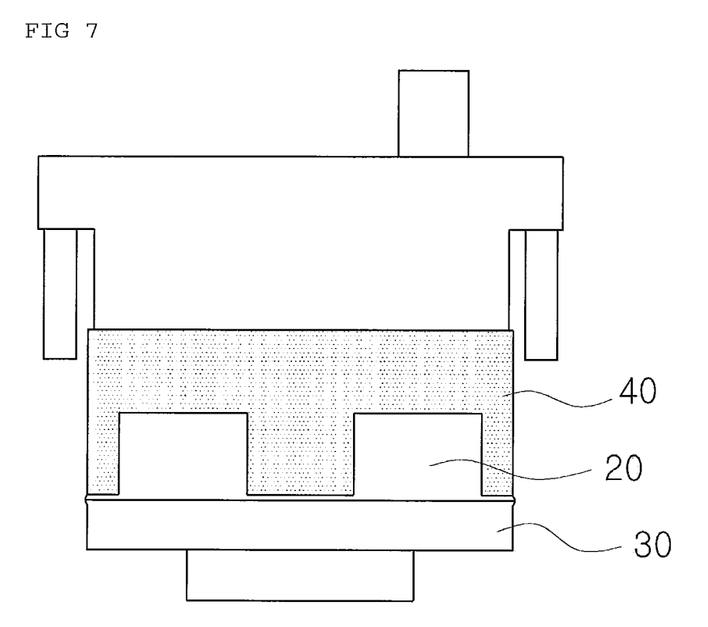
FIG. 7 is a schematic view showing a state in which a deformation prevention reinforcing ring may not be separated downwardly by jaw formed by fusing upper and lower containers to each other to integrate them with each other.

The deformation prevention reinforcing ring 40 according to the present invention may also be positioned so as not to be separated downwardly by a jaw formed by fusing the upper container 20 and the lower container 30 to each other to integrate them with each other.

According to the present invention, the deformation prevention reinforcing ring 40 may be implemented to have protrusions 42 formed on an upper end or a lower end thereof, wherein the protrusions are protruded upwardly or downwardly and are closely adhered to the outer portion of the upper container 20.

The deformation prevention reinforcing ring 40 shown in FIGS. 4 and 5 has a structure in which the protrusions 42 are formed only on the lower end thereof.

With the structure including the protrusions 42, it is possible to obtain an excellent deformation prevention effect while minimizing a size of the deformation prevention reinforcing ring 40. (Considering a production cost, the deformation prevention reinforcing ring 40 is preferably implemented as small as possible in a range of properly performing its role.)

That is, even though the deformation prevention reinforcing ring 40 is not implemented in a form enclosing the entire outer side of the upper container 20, it may accomplish a significantly similar effect to a case in which the deformation prevention reinforcing ring is implemented in a form enclosing the entire outer side of the upper container 20.

The protrusions 42 are preferably uniformly distributed along an outer circumferential surface of the deformation prevention reinforcing ring 40.

That is, when the protrusions 42 are concentrated only in a specific direction of the deformation prevention reinforcing ring 40, an effect in which the protrusions 42 catches the upper container 20 is deteriorated. Therefore, a plurality of protrusions 42 is uniformly distributed over the upper container 20 to uniformly press the upper container 20, thereby making it possible not to deteriorate a reinforcing effect of the upper container 20.

A case in which three protrusions 42 are formed, and angles between the respective protrusions 42 are the same, such that the protrusions 42 are uniformly distributed, as shown in FIG. 5.

The protrusions 42 may be uniformly distributed by allowing distances between the respective protrusions 42 to be equal.

The deformation prevention reinforcing ring 40, which is a component of the present invention, is preferably positioned at an easily deformed portion or a portion at which a weld line is formed.

As a method of finding the easily deformed portion, a known simulation test method (FEA), etc., may be used.

The in-tank filter according to the present invention includes the deformation prevention reinforcing ring having the container insertion hole, and the container insertion hole is closely adhered to the outer side of the upper side when the upper container is inserted thereinto, thereby making it possible to prevent the upper container inserted thereinto from expanding.

Therefore, it is possible to prevent the deformation such as expansion, cracking, or the like, due to the expansion phenomenon and pressure even though the upper and lower containers made of the synthetic resin are used.

In addition, the in-tank filter according to the present invention includes the separation prevention jaw preventing the deformation prevention reinforcing ring from being separated from the upper container, thereby making it possible to increase stability.

Further, the in-tank filter according to the present invention includes protrusions formed on an upper end or a lower end of the deformation prevention reinforcing ring, protruded upwardly or downwardly, and closely adhered to the outer portion of the upper container, making it possible to obtain an excellent deformation prevention effect while minimizing a size of the deformation prevention reinforcing ring.

What is claimed is:

1. An in-tank filter of a fuel pump module comprising:
a filter media filtering foreign materials;
an upper container made of a synthetic resin material and having a filter media insertion space therein, the filter media insertion space having the filter media inserted thereinto;
a lower container made of a synthetic resin material and coupled to a lower open side of the upper container; and
a deformation prevention reinforcing ring having a container insertion hole therein for the upper container to be inserted, so as to prevent the upper container from expanding,
wherein the deformation prevention reinforcing ring is formed by a closed curve, and
wherein the deformation prevention reinforcing ring has one or more protrusions formed on an upper end or a lower end thereof, the one or more protrusions being protruded upwardly or downwardly and being closely adhered to an outer portion of the upper container.

2. The in-tank filter of a fuel pump module of claim 1, wherein the deformation prevention reinforcing ring is made of a metal.

3. The in-tank filter of a fuel pump module of claim 1, wherein the upper container includes a separation prevention jaw formed thereon in order to prevent the deformation prevention reinforcing ring from being separated from the upper container, and the separation prevention jaw is formed to be protruded so as to have a height capable of passing through the deformation prevention reinforcing ring when the upper container is forcibly inserted into the deformation prevention reinforcing ring.

4. The in-tank filter of a fuel pump module of claim 1, wherein the protrusions are uniformly distributed along an outer circumferential surface of the deformation prevention reinforcing ring.

\* \* \* \* \*